US011034866B2

(12) United States Patent
Anderson et al.

(10) Patent No.: US 11,034,866 B2
(45) Date of Patent: Jun. 15, 2021

(54) MULTILAYER ADHESIVE ARTICLE

(71) Applicant: 3M INNOVATIVE PROPERTIES COMPANY, St. Paul, MN (US)

(72) Inventors: Cyrus A. Anderson, Bellingham, WA (US); Kathleen S. Shafer, Woodbury, MN (US); Thomas Q. Chastek, St. Paul, MN (US); Jonathan E. Janoski, Woodbury, MN (US); Michael C. Martin, Hudson, WI (US); Anthony F. Schultz, Forest Lake, MN (US); Carla S. Thomas, Woodbury, MN (US); Peter O. Rekow, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 63 days.

(21) Appl. No.: 16/347,472

(22) PCT Filed: Nov. 21, 2017

(86) PCT No.: PCT/US2017/062755
§ 371 (c)(1),
(2) Date: May 3, 2019

(87) PCT Pub. No.: WO2018/102198
PCT Pub. Date: Jun. 7, 2018

(65) Prior Publication Data
US 2019/0276711 A1 Sep. 12, 2019

Related U.S. Application Data

(60) Provisional application No. 62/429,094, filed on Dec. 2, 2016.

(51) Int. Cl.
*C09J 7/38* (2018.01)
*C09J 7/26* (2018.01)
*B32B 5/18* (2006.01)
*B32B 7/12* (2006.01)
*C09J 5/00* (2006.01)
*C09J 133/06* (2006.01)
*C08J 9/36* (2006.01)
*C09J 133/08* (2006.01)
*C09J 139/04* (2006.01)
*C09J 133/14* (2006.01)
*C09J 163/00* (2006.01)

(52) U.S. Cl.
CPC .................. *C09J 7/385* (2018.01); *B32B 5/18* (2013.01); *B32B 7/12* (2013.01); *C08J 9/36* (2013.01); *C09J 5/00* (2013.01); *C09J 7/26* (2018.01); *C09J 133/066* (2013.01); *C09J 133/08* (2013.01); *C09J 133/14* (2013.01); *C09J 139/04* (2013.01); *C09J 163/00* (2013.01); *B32B 2266/0242* (2013.01); *B32B 2266/0271* (2013.01); *B32B 2405/00* (2013.01); *C08J 2333/14* (2013.01); *C08J 2363/00* (2013.01); *C09J 2301/414* (2020.08); *C09J 2400/243* (2013.01); *C09J 2423/04* (2013.01); *C09J 2423/046* (2013.01); *C09J 2431/00* (2013.01); *C09J 2431/006* (2013.01); *C09J 2433/00* (2013.01); *C09J 2433/006* (2013.01); *C09J 2461/00* (2013.01); *C09J 2461/006* (2013.01); *C09J 2463/00* (2013.01); *C09J 2463/006* (2013.01)

(58) Field of Classification Search
CPC ....... C09J 7/385; C09J 7/26; C09J 5/00; C09J 133/066; C09J 133/08; C09J 133/14; C09J 139/04; C09J 163/00; B32B 5/18; B32B 7/12
See application file for complete search history.

(56) References Cited

U.S. PATENT DOCUMENTS

| 4,173,476 A | 11/1979 | Smith |
| 4,250,053 A | 2/1981 | Smith |
| 4,256,828 A | 3/1981 | Smith |
| 4,415,615 A | 11/1983 | Esmay |
| 4,619,979 A | 10/1986 | Kotnour |
| 4,843,134 A | 6/1989 | Kotnour |
| 5,059,701 A | 10/1991 | Keipert |
| 5,191,101 A | 3/1993 | Palazzotto |
| 5,252,694 A | 10/1993 | Willett |
| 5,256,828 A | 10/1993 | Cuscurida |
| 5,436,063 A | 7/1995 | Follett |
| 5,637,646 A | 6/1997 | Ellis |

(Continued)

FOREIGN PATENT DOCUMENTS

| CN | 103080263 | 5/2013 |
| CN | 105229103 A | 1/2016 |
| CN | 105358648 A | 2/2016 |
| CN | 1336867 | 2/2020 |
| EP | 1 151 853 A1 | 11/2001 |
| EP | 2551102 | 1/2013 |
| EP | 2803712 | 11/2014 |
| WO | WO 1996-07522 | 3/1996 |
| WO | WO 2016-195970 | 12/2016 |
| WO | WO 2016-196561 | 12/2016 |
| WO | WO 2017-117163 | 7/2017 |

OTHER PUBLICATIONS

Epoxy Resins, Encyclopedia of Polymer Science and Technology, vol. 6, 1986, p. 322.

(Continued)

Primary Examiner — Daniel McNally

(57) ABSTRACT

An adhesive article is described comprising a foamed adhesive layer and a non-foamed adhesive layer. The adhesive of each adhesive layer comprises a tetrahydrofurfuryl (meth) acrylate copolymer; an epoxy resin; a polyether polyol; and optionally a hydroxy-functional film-forming polymer. The adhesive may be used in structural and semi-structural bonding applications and is designed to fail cohesively.

20 Claims, No Drawings

(56) References Cited

U.S. PATENT DOCUMENTS

| | | | |
|---|---|---|---|
| 5,709,948 A | | 1/1998 | Perez |
| 5,804,610 A | | 9/1998 | Hamer |
| 6,136,384 A | * | 10/2000 | Karim .................... C08L 63/00 |
| | | | 427/516 |
| 6,294,239 B1 | * | 9/2001 | Tokuda ............... C08F 290/067 |
| | | | 428/65.2 |
| 6,579,588 B2 | | 6/2003 | Waid |
| 6,797,371 B1 | | 9/2004 | Gehlsen |
| 6,852,781 B2 | | 2/2005 | Savu |
| 7,491,434 B2 | | 2/2009 | Khandpur |
| 7,879,441 B2 | | 2/2011 | Gehlsen |
| 2014/0072731 A1 | * | 3/2014 | Seo ........................ C08G 65/20 |
| | | | 428/1.53 |

OTHER PUBLICATIONS

International Search Report for PCT International Application No. PCT/US2017/062755, dated Feb. 2, 2018, 4 pages.

\* cited by examiner

MULTILAYER ADHESIVE ARTICLE

CROSS REFERENCE TO RELATED APPLICATIONS

This application is a national stage filing under 35 U.S.C. 371 of PCT/US2017/062755, filed Nov. 21, 2017, which claims the benefit of U.S. Provisional Application No. 62/429,094, filed Dec. 2, 2016, the disclosures of which are incorporated by reference in their entirety herein.

FIELD OF THE INVENTION

The present invention is directed to structural and semistructural bonding adhesive articles, and methods for preparing the adhesive and articles. The present invention is further directed to articles of manufacture containing one or more components bonded together with structural bonding adhesive.

BACKGROUND

Structural bonding tapes are useful for bonding one or more substrates to one another. Many structural bonding tapes fall into one of two groups: (1) heat-curable structural bonding tapes, and (2) ultraviolet (UV) light-activatable structural bonding tapes. As suggested by the class name, heat-curable structural bonding tapes require heat to cure the adhesive composition of the tape. The UVi structural bonding tapes contain an adhesive composition that will begin to cure when exposed to UV light, but does not require heat for curing. Heat may be used to accelerate the rate of cure for UVi structural bonding tapes.

Typically, a length of structural bonding tape or a die cut piece of tape is removed from a roll, and attached to a first substrate using finger pressure. In the case of UVi structural bonding tapes, the structural bonding tape can be exposed to actinic radiation, such as UV. Then, a second substrate is brought into contact with the exposed surface of the structural bonding tape, and pressure is applied to the substrates for a period of time. Heat-curable structural bonding tapes, and optionally UVi structural bonding tapes, are then exposed to heat and the assembly is then allowed to cool. The result is a bonded article.

Further, conventional UVi structural bonding tape formulations possess high cold flow properties. Cold flow is a measure of the creep behavior of a material at non-elevated temperatures. Many conventional UVi tape materials possess undesirably high cold flow properties, which result in significant material flow under roll winding tensions and stacking weight. As a result, these materials may require cold storage and/or special packaging to maintain dimensionally stable rolls and die cut parts.

In addition, many current structural adhesive compositions require heat to cure the adhesive composition. In a process of making bonded articles, the bonded article must be subjected to a heating step in order to cure the adhesive composition as well as a cooling step in order to allow for further handling and/or packaging of the bonded article. From a processing standpoint, a process of making bonded articles without a heating step would be highly desirable.

In most applications, the structural or semi-structural bond is designed to be permanent. As a result, efforts to separate the substrates are often unsuccessful and result in substrate damage. In addition, the cured adhesive composition exhibits unpredictable cohesive and adhesive failure at either substrate.

There are applications, however, in which it would be preferable for the adhesive composition to exhibit high performance bond properties during use (i.e., the period and environmental conditions, e.g., temperature range, over which the adhesive composition performs as a semi-structural adhesive), yet be removable after use, or to permit a joint between substrates to be re-worked. A tension exists between these opposing performance criteria. In many industries, articles are bonded to substrates using structural and semi-structural adhesives. Over time the articles and/or substrates may require replacement, or the joint to the substrate inspected for wear. It would be preferable if these articles could be removed, reworked and/or replaced with new articles.

What is needed in the art is an adhesive article which has bonding performance and/or may be used to bond different substrates having different coefficients of thermal expansion and different physical and/or chemical surface characteristics. In addition, what is needed in the art is a UVi structural bonding tape, which allows the tape to be light-activatable from one side of the tape. What is needed is an adhesive article that allows for the bonded surfaces to be separated as desired.

SUMMARY

The present disclosure addresses some of the difficulties and problems discussed above by the discovery of a novel adhesive article with exceptional adhesion properties. The structural bonding adhesive article possesses desired strength and adhesion properties. The adhesive of the article is light-activated (i.e., cure is initiated upon exposure to a light source) and does not require heat for curing. The structural bonding adhesive article may be used in a number of applications, in particular, as an adhesive for bonding together one or more substrates, and which permits the separation of the bonded surfaces without damage to allow rework as desired.

"Semi-structural adhesives" are those cured adhesives that have an overlap shear strength of at least about 0.75 MPa, more preferably at least about 1.0 MPa, and most preferably at least about 1.5 MPa. Those cured adhesives having a particularly high overlap shear strength, however, are referred to as structural adhesives. Structural adhesives are those cured adhesives that have an overlap shear strength of at least about 3.5 MPa, more preferably at least about 5 MPa, and most preferably at least about 7 MPa.

The present invention describes a curable pressure sensitive adhesive article that upon curing provides a semi-structural or structural adhesive. The adhesive article comprises at least one frangible foamed adhesive layer and at least one non-foamed adhesive layer. In some embodiments the adhesive articles permit selective adhesive failure by allowing two surfaces to be essentially inseparable at use, yet readily separable upon applying a shear force such that the foamed adhesive layer undergoes selective cohesive failure. This feature is useful in bonding applications because it allows for the removal of the article without damage to the bonding surfaces. The adhesive article selectively fails by cohesive failure of the foam layer. In addition, the foam layer allows conformability in bonding substrates having different physical and chemical characteristics.

Each of the pressure sensitive adhesive layers comprise:
a) a tetrahydrofurfuryl (meth)acrylate copolymer;
b) an epoxy resin;
c) a polyether polyol;
d) optionally a hydroxy-functional film-forming polymer; and
(e) a photocatalyst. Each layer may have the same or different amounts of the components.

DETAILED DESCRIPTION

The adhesive composition of both the foamed and non-foamed adhesive layers comprise, in part, a tetrahydrofurfuryl (meth)acrylate (THF) copolymer component. Unless otherwise specified, the THF acrylates and methacrylates will be abbreviated as THFA. More particularly, the adhesive composition comprises a copolymer of tetrahydrofurfuryl (meth)acrylate, a $C_1$-$C_8$ (meth)acrylate ester and an optional cationically reactive functional (meth)acrylate.

In addition to the tetrahydrofurfuryl (meth)acrylate, the copolymer further comprises a $C_1$-$C_8$ alkyl (meth)acrylate ester monomer. Useful monomers include the acrylates and methacrylate of methyl, ethyl, propyl, isopropyl, butyl, pentyl, hexyl, heptyl and octyl alcohols, including all isomers, and mixtures thereof. It is preferred that the alcohol is selected from $C_3$-$C_6$ alkanols, and in certain embodiments, the molar average carbon number of the alkanols is $C_3$-$C_6$. It has been found that within this range the copolymer has sufficient miscibility with the epoxy resin component and it allows for formulation of a UVi SBT with a useful overall balance of adhesive properties, including overlap shear.

The carbon number molar average may be calculated by summing the number of moles of each alkanol ($C_{1-8}$ alkanols) multiplied by the carbon number of each alkanol, and dividing the result by the total number of moles of alkanols:

$$\Sigma_{\alpha-\omega}[(\text{Moles of alkanol}) \times (\text{\#carbon atoms for alkanol})]/\text{\#moles of alkanols } \alpha \text{ to } \omega.$$

In addition, the copolymer may contain a cationically reactive monomer, i.e. a (meth)acrylate monomer having a cationically reactive functional group. Examples of such monomers include, for example, glycidyl acrylate, glycidyl methacrylate, hydroxyethyl acrylate, hydroxyethyl methacrylate, hydroxypropyl methylacrylate, hydroxybutyl acrylate and alkoxysilylalkyl (meth)acrylates, such as trimethoxysilylpropyl acrylate.

Optionally a multifunctional (meth)acrylate may be incorporated into the blend of polymerizable monomers to crosslink the copolymer and build cohesive strength. Examples of useful multifunctional (meth)acrylates include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition, for example, adhesives, hardcoats or dental resins. Typically, the multifunctional (meth)acrylate is present in amounts up to 10 parts, preferably 0.1 to 100 parts, based 100 parts by weight of remaining polymerizable monofunctional monomers.

For stability of the polymerizable composition, the copolymer contains essentially no acid functional monomers, whose presence would initiate polymerization of the epoxy resin prior to UV curing. For the same reason, it is preferred that the copolymer not contain any amine-functional monomers. Furthermore, it is preferred that the copolymer not contain any acrylic monomers having moieties sufficiently basic so as to inhibit cationic cure of the adhesive composition, such as amide, lactam, urea, urethane, carboxylate, thiolate, sulfate, phosphate, and phosphine groups, and the like.

The THFA copolymer generally comprises polymerized monomer units of:
a) 40-60 wt. %, preferably >45 to 55, more preferably 45-55 wt. %, of tetrahydrofurfuryl (meth)acrylate
b) 40-60 wt. %, preferably 45 to 60 more preferably 45-55 wt. %, of $C_1$-$C_8$, preferably $C_3$-$C_6$ alkyl (meth)acrylate ester monomers;
c) 0 to 10 wt. %, preferably 1 to 5 wt. % of cationically reactive functional monomers;
d) 0 to 10 wt. %, preferably 1 to 5 wt. % of a multifunctional (meth)acrylate;
wherein the sum of a)-c) is 100 wt. %.

The adhesive compositions comprise one or more THFA acrylate copolymers in an amount, which varies depending on the desired properties of the adhesive. Desirably, the adhesive composition comprises one or more THFA acrylate copolymers in an amount of from 15 to 65, preferably 15 to 50 parts, more preferably 25-35 parts by weight, based on the 100 parts total weight of the monomers/copolymers in the adhesive composition.

The adhesive comprises one or more epoxy resins. The epoxy resins or epoxides that are useful in the composition of the present disclosure may be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy group per molecule and preferably at least 2 epoxy groups per molecule. The useful materials typically have a weight average molecular weight of about 150 to about 10,000, and more typically of about 180 to about 1,000. The molecular weight of the epoxy resin is usually selected to provide the desired properties of the cured adhesive. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendant epoxy groups (e.g., a glycidyl methacrylate polymer or copolymer), and mixtures thereof. The epoxide-containing materials include compounds having the general formula:

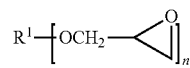

where $R^1$ is an alkyl, alkyl ether, or aryl, and n is 1 to 6.

These epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Also useful are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p. 322 (1986).

The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Examples of commercially available epoxides useful in the present disclosure include diglycidyl ethers of bisphenol A (e.g, those available under the trade designations EPON 828, EPON 1001, EPON 1004, EPON 2004, and EPONEX 1510 from Momentive Specialty Chemicals, Inc., and those under the trade designations D.E.R. 331, D.E.R. 332, D.E.R. 334, and D.E.N. 439 available from Dow Chemical Co.); diglycidyl ethers of bisphenol F (e.g., that are available under the trade designation ARALDITE GY 281 available from Huntsman Corporation); silicone resins containing diglycidyl epoxy functionality; flame retardant epoxy resins (e.g., that are available under the trade designation DER 560, a brominated bisphenol type epoxy resin available from Dow Chemical Co.); and 1,4-butanediol diglycidyl ethers.

Epoxy containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, to flexibilize the cured composition, and to compatibilize materials in the composition.

Examples of such diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N'N'-tetraglycidyl meta-xylylene diamine, and vegetable oil polyglycidyl ether. Reactive diluents are commercially available under the trade designation HELOXY 107 and CARDURA N10 from Momentive Specialty Chemicals, Inc. The composition may contain a toughening agent to aid in providing the desired overlap shear, peel resistance, and impact strength.

The adhesive composition desirably contains one or more epoxy resins having an epoxy equivalent weight of from about 100 to about 1500. More desirably, the adhesive contains one or more epoxy resins having an epoxy equivalent weight of from about 300 to about 1200. Even more desirably, the adhesive contains two or more epoxy resins, wherein at least one epoxy resin has an epoxy equivalent weight of from about 150 to about 250, and at least one epoxy resin has an epoxy equivalent weight of from about 500 to about 600.

The adhesive composition may comprise one or more epoxy resins in an amount, which varies depending on the desired properties of the structural adhesive layer. Desirably, the adhesive composition comprises one or more epoxy resins in an amount of from 25 to 50 parts, preferably 35-45 parts by weight, based on the 100 parts total weight of the monomers/copolymers in the adhesive composition.

The adhesive composition further comprises a lower Mw, liquid (at 25° C.) hydroxy-functional polyether (polyether polyol) in amounts of 5-15 parts, relative to 100 parts total weight of the monomers/copolymers in the adhesive composition.

Examples of this class of a hydroxy-functional polyether compound include, but are not limited to, polyoxyethylene and polyoxypropylene glycols; polyoxyethylene and polyoxypropylene triols and polytetramethylene oxide glycols. The polyoxyalkylene polyols are particularly suitable for retarding the curing reaction so that the "open time" of the adhesive composition can be increased. As used herein, the term "open time" is used to mean the period of time after an adhesive composition has been irradiated, during which time the adhesive composition remains sufficiently uncured for a second substrate to be bonded thereto.

The open time of the adhesive composition is desirably at least 2 minutes after exposure to an energy dose of about 1.6 J/cm$^2$ of actinic radiation. However, if one or both substrates that are being bonded together are translucent for the radiation to which the structural adhesive layer is to be exposed, the open time is of no relevance because in that case the exposure to the radiation can be effected through the translucent substrate after both substrates have been attached to each other by the adhesive. When both substrates of the assembly are opaque, the adhesive will be exposed to actinic radiation prior to attaching the second substrate thereto. In this case, an open time of at least 2 minutes is desirable to allow for suitable workability of the structural adhesive layer.

Commercially available hydroxy-functional poly(alkylenoxy) compounds suitable for use in the present invention include, but are not limited to, the POLYMEG™ series of polytetramethylene oxide glycols (available from Lyondellbasell, Inc., Jackson, Tenn.), the TERATHANE™ series of polytetramethylene oxide glycols (from Invista, Newark, Del.); the POLYTHF™ series of polytetramethylene oxide glycol from BASF Corp. (Charlotte, N.C.); the ARCOL™ and ACCLAIM™ series of polyoxypropylene polyols (from Covestro) and the VORANOL™ series of polyether polyols from Dow Automotive Systems, Auburn Hills, Mich.

The adhesive layer optionally contains at least one hydroxyl-functional film-forming polymer having at least one and desirably at least two hydroxyl groups. Further, the terms hydroxyl-functional film-forming polymer does not include the polyether polyols described above, which also contain hydroxyl groups. Desirably, the film-forming polymer are substantially free of other "active hydrogen" containing groups such as amino and mercapto moieties. Further, the film-forming polymer are also desirably substantially free of groups, which may be thermally and/or photolytically unstable so that the compounds will not decompose when exposed to actinic radiation and/or heat during curing.

The hydroxyl-containing film-forming polymer contains two or more primary or secondary aliphatic hydroxyl groups (i.e., the hydroxyl group is bonded directly to a non-aromatic carbon atom). In some embodiments, the hydroxyl-functional film-forming polymer has a hydroxyl number of at least 0.01. It is believed the hydroxyl groups participate in the cationic polymerization with the epoxy resin.

The hydroxyl-functional film-forming polymer may be selected from phenoxy resins, ethylene-vinyl acetate (EVA) copolymers (solid at 25° C.), polycaprolactone polyols, polyester polyols, and polyvinyl acetal resins that are solid at 25° C. The hydroxyl group may be terminally situated, or may be pendent from a polymer or copolymer.

It has been found that the addition of a film-forming polymer to the structural adhesive composition improves the dynamic overlap shear strength and/or decreases the cold flow of the adhesive layer.

One useful class of hydroxyl-containing film-forming polymers is hydroxy-containing phenoxy resins. Particularly desirable phenoxy resins are those that are derived from the polymerization of a di-glycidyl bisphenol compound. Typically, the phenoxy resin has a number average molecular weight of less than 60,000, desirably in the range of about 20,000 to about 30,000. Commercially available phenoxy resins suitable for use in the present invention include, but are not limited to, PAPHEN™ PKHP-200, available from Inchem Corp. (Rock Hill, S.C.) and the SYNFAC™ series of polyoxyalkylated bisphenol A (from Milliken Chemical, Spartanburg, S.C.) such as SYN FAC™ 8009, 773240, 8024, 8027, 8026, 8071 and 8031;

A second useful class of hydroxyl-containing film-forming polymers is ethylene-vinyl acetate (EVA) copolymer resins. EVA resins contain small amounts of free hydroxyl groups, and it is believed that the EVA copolymers are further deacetylated during cationic polymerization.

Suitable ethylene-vinyl acetate copolymer resins include, but are not limited to, thermoplastic ethylene-vinyl acetate copolymer resins containing at least about 28 percent by weight vinyl acetate. In one embodiment of the present invention, the ethylene-vinyl acetate copolymer comprises a thermoplastic copolymer containing at least about 28 percent by weight vinyl acetate, desirably at least about 40 percent by weight vinyl acetate, more desirably at least about 50 percent by weight vinyl acetate, and even more desirably at least about 60 percent by weight vinyl acetate by weight of the copolymer. In a further embodiment of the present invention, the ethylene-vinyl acetate copolymer contains an amount of vinyl acetate ranging from about 28 to about 99 weight percent of vinyl acetate, desirably from about 40 to about 90 weight percent of vinyl acetate, more desirably from about 50 to about 90 weight percent of vinyl acetate, and even more desirably from about 60 to about 80 weight percent vinyl acetate in the copolymer.

Examples of commercially available ethylene-vinyl acetate copolymers, which may be used in the present invention include, but are not limited to, the Elvax series, including ELVAX™ 150, 210, 250, 260, and 265 from E. I. Du Pont de Nemours and Co., Wilmington, Del., the ATEVA™ series from Celanese, Inc., Irving, Tex.); the LEVAPREN™ 400 from Lanxess Corp., Pittsburgh, Pa. including, LEVAPREN™ 450, 452, and 456 (45 weight percent vinyl acetate); LEVAPREN™ 500 HV (50 weight percent vinyl acetate); LEVAPREN™ 600 HV (60 weight percent vinyl acetate); LEVAPREN™700 HV (70 weight percent vinyl acetate); and LEVAPREN™ KA 8479 (80 weight percent vinyl acetate), each from Lanxess Corp.

Additional useful film-forming polymers include the TONE™ of polycaprolactone polyols series available from Dow Chemical, Midland, Mich., the CAPA™ series of polycaprolactone polyols from Perstorp Inc., the DESMO-PHEN™ series of saturated polyester polyols (available from Covestro, Pittsburgh, Pa.) such as DESMOPHEN™ 631 A 75.

One or both of the foamed and non-foamed adhesive layer(s) may comprise one or more hydroxyl-containing film-forming polymers resins in an amount, which varies depending on the desired properties of the structural adhesive layer. Desirably, the adhesive composition comprises one or more hydroxyl-containing film-forming polymer resins in an amount of up to about 25 parts by weight, based on 100 parts total weight of the monomers/copolymers in the adhesive composition. More desirably, the adhesive composition comprises one or more film-forming polymers resins in an amount of from about 10 to about 25 parts by weight, based on 100 parts total weight of the monomers/copolymers in the adhesive composition. Even more desirably, the structural adhesive layer of the structural bonding tape of the present invention comprises one or more film-forming polymer resins in an amount of 15 to about 20 parts by weight, based on 100 parts total weight of the monomers/copolymers in the adhesive composition.

In summary, the curable adhesive composition of both foamed and non-foamed layer comprises:
a. 15 to 65, preferably 15 to 50, parts of a tetrahydrofurfuryl (meth)acrylate copolymer;
b. 25 to 50 parts of an epoxy resin component;
c. 5-15 parts of a polyether polyol;
d. 0 to 25, preferably 10 to 25 parts of a hydroxy-functional film-forming polymer;
wherein the sum of a) to d) is 100 parts by weight; and
e. 0.01 to 5 parts of a cationic photoinitiator, relative to 100 parts of a) to d).

The composition of the foamed and non-foamed layers may be the same or different, and may vary within the above ranges. In many embodiments the amount of epoxy resin is greater than the THFA copolymer; the weight ratio of epoxy resin to acrylate polymer is from 1:2 to 5:1, preferably 1:1.1 to 5:1.

The adhesive composition may further comprise up to about 50 parts by weight (relative to 100 parts by weight of a) to d)), desirably, up to about 10 percent, of various additives such as fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, and the like, such as silica, glass, clay, talc, pigments, colorants, glass beads or bubbles, and antioxidants, so as to reduce the weight and/or cost of the structural adhesive layer composition, adjust viscosity, and/or provide additional reinforcement or modify the thermal conductivity of the adhesive compositions and articles of the present invention so that a more rapid or uniform cure may be achieved. The nature of the additive and the amount thereof should not interfere with the transmissivity of the curable adhesive.

The adhesive article contains at least one frangible adhesive foam layer and at least one non-foamed adhesive layer. In preferred embodiments, the adhesive article comprises two non-foamed layers and the foamed layer disposed therebetween. As used herein, a foam refers to an article that includes a polymer matrix in which the density of the article is less than the density of the polymer matrix alone. Density reduction is achieved in a number of ways, including through creation of gas-filled voids in the matrix (e.g., by means of a blowing agent) or inclusion of polymeric microspheres (e.g., expandable microspheres) or non-polymeric microspheres (e.g., glass microspheres). Any means of initiating voids to produce a foam layer will be known collectively as a void-initiating component.

In some embodiments the foamed adhesive layer comprises a chemical blowing agent. Chemical blowing agents are dispersed in the adhesive composition at a temperature below that of the decomposition temperature of the blowing agent, and may be added to the polymer feed at room temperature prior to introduction to the extruder. The blowing agent is then mixed to distribute it throughout the adhesive composition in undecomposed form below the activation temperature of the chemical blowing agent. Once dispersed, the chemical blowing agent may be activated by heating the mixture to a temperature above its decomposition temperature of the agent. Decomposition of the blowing agent liberates gas, such as $N_2$, $CO_2$ and/or $H_2O$, yet cell formation is restrained by the temperature and pressure of the system. Useful chemical blowing agents typically decompose at a temperature of 140° C. or above.

Examples of such materials include synthetic azo-, carbonate-, and hydrazide-based molecules, including azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide and trihydrazino triazine. Specific examples of these materials are Celogen OT™ (4,4' oxybis (benzenesulfonylhydrazide), Hydrocerol BIF (preparations of carbonate compounds and polycarbonic acids), Celogen AZ (azodicarbonamide) and Celogen RA (p-toluenesulfonyl semicarbazide).

In addition to the chemical blowing agents, the foam may be prepared by injecting a gas into the polymer matrix. For example the adhesive composition can be transferred to a frother as described for examples in U.S. Pat. No. 4,415,615; incorporated herein by reference. While feeding nitrogen gas into the frother, the frothed composition can be delivered to the nip of a roll coater between a pair of transparent, (e.g. biaxially-oriented polyethylene terephthalate) films. A silicone or fluorochemical surfactant may be included in the froathed composition. Various surfactants are known including copolymer surfactants described in U.S. Pat. No. 6,852,781.

In preferred embodiments the foamed adhesive layer comprises microspheres. The microspheres may be polymeric microspheres (including expandable or pre-expanded microspheres) or non-polymeric microspheres (e.g., glass microspheres). An "expandable polymeric microsphere" is a microsphere that includes a polymer shell and a core material in the form of a gas, liquid, or combination thereof that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The choice of thermoplastic resin for the polymeric shell influences the mechanical properties of the foam. Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density articles.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres having essentially no vinylidene chloride units.

Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations "Expancel 551," "Expancel 461," and "Expancel 091." Each of these microspheres features an acrylonitrile-containing shell. In addition, the F80SD, F100D, and Expancel 091 microspheres have essentially no vinylidene chloride units in the shell. re-expanded and expandable microspheres are available under the Duolite tradename from Chase Corp, Westwood, Mass.

The amount of chemical blowing agent or microspheres incorporated into the foamable adhesive composition is chosen to yield a foam having a reduction of at least 10%, more preferably in excess of 20%, as measured by density reduction; [1−the ratio of the density of the foam to that of the neat adhesive composition]×100. The chemical blowing agent is added in amounts such that the maximum foam density is 50%. Generally, the foam layer has a density of 0.45 to 0.85 g/cm³, preferably 0.6 to 0.85 g/cm³.

Generally, greater foam void content reduces the foam density, and the cohesive strength. However, the void volume of the foamed layer(s), and the thicknesses of both the foamed and non-foamed layer are chosen such that the adhesive article has sufficient mechanical properties for the bonding application. Generally the foam layer has a tensile strength of 350-800 psi (2.4-5.5 MPa) and the non-foam layer has a tensile strength 1500 to 4800 psi (10.4-33.1 MPa), using the test method described herein. Further, the adhesive article should fail cohesively through the foam layer, having a parallel torque test value of >10 Newton-meters using the test method herein The adhesive composition for each layer may be prepared by combining the tetrahydrofurfuryl (meth)acrylate copolymer with an epoxy resin, polyether polyol, the optional hydroxy-functional film-forming polymer and a cationic photoinitiator, and photopolymerizing the mixture by irradiation with actinic radiation, preferably UV. The foam layer will further include a blowing agent, or microspheres to provide the requisite density reduction. The composition of the foamed and non-foamed layer may be the same or different, but will fall within the cited ranges supra In some embodiments, the (meth)acrylate copolymer is separately prepared by free radical polymerization of the monomer mixture with a photo- or thermal initiator. The copolymers may be prepared by any conventional free radical polymerization method, including solution, radiation, bulk, dispersion, emulsion, solventless, and suspension processes. The resulting adhesive copolymers may be random or block (co)polymers.

Thermal initiators useful in preparing the THFA copolymers are initiators that, on exposure to heat, generate free-radicals which initiate (co)polymerization of the monomer mixture. Suitable water-soluble initiators include those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfate; and 4,4'-azobis (4-cyanopentanoic acid) and its soluble salts (e.g., sodium, potassium). Suitable initiators also include those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)).

When used, thermal initiators may comprise from about 0.05 to about 1 part by weight, preferably about 0.1 to about 0.5 part by weight based on 100 parts by weight of monomer components in the pressure-sensitive adhesive.

Useful photoinitiators include benzoin ethers such as benzoin methyl ether and benzoin isopropyl ether; substituted acetophenones such as 2, 2-dimethoxyacetophenone, available as Irgacure™ 651 photoinitiator (BASF, Ludwigshafen, Germany), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Such photoinitiators preferably are present in an amount of from 0.1 to 1.0 pbw per 100 parts of the monomer mixture. The monomer mixture and the photoinitiator may be irradiated with activating UV radiation to polymerize the monomer component(s).

UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

One useful class of actinic light sources uses light emitting diodes ("LED"). LED-based UV sources are advantageous because they are capable of generating UV light over a much narrower wavelength range compared with other UV light sources such as black lights and mercury lamps. Such LED sources are commercially available, for example, the AC Series 365 nm or 395 nm LED Curing Systems available from Excelitas Technologies (Waltham, Mass.).

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 24 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In some embodiments, acrylic mixtures may be prepared by charging a glass jar with the acrylic monomers and film-forming polymer. The mixture can then be rolled overnight, or mixed using a Netzsch Model 50 Dispersator, until clear and homogeneous. The resulting material may be combined with the other components of the adhesive composition, optionally coated onto a substrate (such as a release liner) and polymerized.

The polymerizations may be conducted in the presence of, or preferably in the absence of, suitable solvents such as ethyl acetate, toluene and tetrahydrofuran which are unreactive with the functional groups of the components of the syrup polymer.

A syrup polymer technique comprises partially polymerizing monomers to produce a syrup polymer comprising the solute THFA (meth)acrylate copolymer and unpolymerized solvent monomers. The syrup polymer composition is polymerized to a useful coating viscosity, which may be combined with the other components of the adhesive composition, optionally coated onto a substrate (such as a tape backing) and further polymerized. Partial polymerization provides a coatable solution of the THFA (meth)acrylate solute copolymer in one or more solvent monomers. It will be understood that if a syrup polymerization method is used, additional free radical initiator is necessary to fully polymerize the solvent monomers after compounding.

In a preferred embodiment, the THFA copolymer is prepared by a syrup polymer technique, and the resulting syrup, comprising a solute copolymer and solvent monomer, is combined with the epoxy resin, the polyether polyol, cationic photoinitiator, and the optional film-forming polymer. The foamed layer will include the foaming agent. The copolymer in the composition may be further irradiated to effect polymerization, crosslinking, and increasing viscosity. In this method the free radical photoinitiator should be chosen to effect polymerization at a distinct wavelength than that of the cationic photoinitiator to avoid polymerization of the epoxy component. Generally this syrup technique uses a free radical photoinitiator at a near visible frequency, and then a cationic photoinitiator at a UV frequency.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers. Preferably, the first copolymer is prepared by the adiabatic batch polymerization process wherein the total of the absolute value of any energy exchanged to or from the batch during the course of reaction will be less than about 15% of the total energy liberated due to reaction for the corresponding amount of polymerization that has occurred during the time that polymerization has occurred, as described in U.S. Pat. No. 5,637,646 (Ellis), incorporated herein by reference.

Preferably the components are combined and photopolymerized using the methods described in the methods described for polymerizing packaged pre-adhesive compositions described in WO9607522 (Hamer et al.) and in U.S. Pat. No. 5,804,610 (Hamer et al.), incorporated herein by reference.

In the methods of Hamer, the packaging material used to form the reaction vessel or container is preferably made of a material that when combined with the adhesive composition does not substantially adversely affect the desired adhesive characteristics. A hot melt coated adhesive produced from a mixture of the adhesive composition and the packaging material may have improved adhesive properties compared to a hot melt coated adhesive produced from the adhesive composition alone.

In some embodiments a reaction mixture is coated onto a carrier web, covered with a sheet material, and polymerized, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not hot melt coatable with the adhesive it should be treated, if necessary, so that the adhesive can be removed easily from it. Such treatments include silicone release coatings, polyfluoropolyether coatings, and polyfluoroethylene coatings such as Teflon™.

If desired, a chain transfer agent may be added to the monomer mixture to produce a THFA copolymer having the desired molecular weight. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide.

The chain transfer agent may be used in amounts such that THFA copolymer has a a tan delta of 0.75 to 3.0 at the processing temperature of the adhesive, e.g. 120° C. The monomer mixture may further comprise up to about 5 parts by weight of a chain transfer agent, typically about 0.01 to about 5 parts by weight, if used, preferably about 0.05 parts by weight to about 0.5 parts by weight, based upon 100 parts by weight of the total monomer mixture.

The components of the adhesive composition may be combined and mixed in a suitable mixing vessel at an elevated temperature low enough to avoid decomposition of any photoinitiator present in the adhesive composition. Although mix times may vary, the components of the adhesive composition are desirably mixed for a period of time sufficient to form a uniform mixture of components.

After mixing, the adhesive composition may be formed into its final shape by a variety of different methods. For example, the adhesive composition may be coated onto a release liner to form a layer using a heated knife coater. Alternatively, the components of the adhesive composition may be compounded in an extruder and then extruded through a die having a desired profile to produce a shaped strip of adhesive; that is, a strip having a desired cross-sectional shape. In a further approach, the adhesive composition may be extruded as a mass and delivered between a pair of motor-driven chilled rolls spaced apart a predetermined distance to form a flat sheet of the structural adhesive layer adhesive composition that may be subsequently calendared to a desired thickness. The foam and non-foamed adhesive layers may be separately extruded and laminated, or may be coextruded.

In a batch process, the adhesive composition is prepared by mixing the various ingredients in one or more suitable vessels, desirably vessels that are not transparent to actinic radiation. The liquid components, such as liquid epoxies and hydroxyl-containing materials, may be premixed in a first vessel at a temperature sufficient to liquefy the components. The components may be added simultaneously or sequentially in any order; however, it is desirable to add the cationic photoinitiator after all of the other components have been thoroughly mixed.

In a continuous process, the adhesive composition is mixed in an extruder, for example a twin screw extruder, equipped with a downstream port, a static mixer, and an appropriate output orifice (i.e., film die, sheet die, profile die, etc.) and a take-up roll and wind up roll(s), as appropriate. Take-up line speed may be adjusted as appropriate for the output form.

The compounded adhesive composition may be cured with a cationic photoinitiator. Suitable photoinitiators include, but are not limited to, onium salts and cationic organometallic salts, both of which are described in U.S. Pat. No. 5,709,948 and photoactivatable organometallic complex salts such as those described in U.S. Pat. Nos. 5,059,701; 5,191,101; and 5,252,694.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Suitable aromatic iodonium complex salts are described more fully in U.S. Pat. No. 4,256,828. In one embodiment of the present invention, the desired aromatic iodonium complex salt is $[(Ar)_2I]^+[PF6]^-$ or $[(Ar)_2I]^+[SbF_6]^-$, where Ar are the same or different and each comprises an aromatic group having from 4 to 20 carbon atom.

The aromatic iodonium complex salts useful in the present invention are photosensitive in the ultraviolet region of the spectrum. However, they can be sensitized to the near ultraviolet and the visible range of the spectrum by sensitizers for known photolyzable organic halogen compounds. Illustrative sensitizers include colored aromatic polycyclic hydrocarbons, as described in U.S. Pat. No. 4,250,053. Suitable sensitizers should be chosen so as to not interfere appreciably with the cationic cure of the epoxy resin in the adhesive composition.

Suitable sulfonium salts include triaryl-substituted salts such as triphenylsulfonium hexafluoroantimonate and p-(phenyl(thiophenyl)diphenylsulfonium hexafluoroantimonate are the desired sulfonium salts. Other sulfonium salts useful in the present invention are described more fully in U.S. Pat. Nos. 5,256,828 and 4,173,476. Aromatic sulfonium complex salts useful in the present invention are typically photosensitive in the ultraviolet region of the spectrum. However, they can be sensitized to the near ultraviolet and the visible range of the spectrum by a select group of sensitizers such as described in U.S. Pat. Nos. 4,256,828 and 4,250,053.

If a sensitizer is used in combination with an onium salt as described above, it should be chosen so as to not interfere appreciably with the cationic cure of the epoxy resin in the adhesive composition.

In some embodiments, a sensitizer may be used as a dye or an indicator which 1) identifies the location of the adhesive in the connector; 2) participates in the curing reaction; and 3) undergoes a color change which reflects the onset of curing. When used as a color change indicator in the curable composition, the composition may be cured at an irradiated wavelength corresponding to the lambda max of the photoinitiator, rather than the sensitizer. The incipient acid released from the initiator reacts with the sensitizer, effecting a color change.

Suitable sensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. For applications requiring high sensitivity, it is preferred to employ a sensitizer containing a julolidinyl moiety. For applications requiring deep cure (e.g., where the coating or strengthening fibers attenuate radiation of similar wavelengths), it is preferred to employ sensitizers having an extinction coefficient below about 1000, more preferably below about 100, at the desired wavelength of irradiation for photopolymerization. Alternatively, sensitizers that exhibit bleaching at the appropriate wavelength(s) may also be used. In this reaction, the sensitizer bleaches the composition, and the initiation may then progress through the layer or layers of material.

By way of example, a preferred class of ketone sensitizers has the formula:

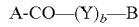

where Y is CO or $CR^{11}R^{12}$, where $R^{11}$ and $R^{12}$ can be the same or different, and can be hydrogen, alkyl, alkaryl or aralkyl, b is one or zero, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic heteroaromatic or fused aromatic ring.

Suitable ketones of the above formula include monoketones (b=0) such as 2,2'-, 4,4'- or 2,4-dihydroxybenzophenone, di-2-pyridyl ketone, di-2-furanyl ketone, di-2-thiophenyl ketone, benzoin, fluorenones, quinones, e.g., chloroquinone, 2-aza-3-carboxy-9-fluorenone, and the like, chalcone, Michler's ketone, 2-fluoro-9-fluorenone, 2-chlorothioxanthone, acetophenone, benzophenone, 1- or 2-acetonaphthone, 9-acetylantracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7- and 1,8-diacetylnaphthalene, 1,5-, 1,8- and 9,10-diacetylanthracene, and the like. Suitable .alpha.-diketones (b=1 and X═CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-, 3,3'- and 4,4'-dihydroxybenzil, furil, di-3,3'-indolylethanedione, 2,3-bornanedione (camphorquinone), 1,2-cyclohexanedione, 1,2-naphthaquinone, acenaphthaquinone, and the like.

Other preferred sensitizers include Rose Bengal, Methylene Violet, Fluorescein, Eosin Yellow, Eosin Y, Ethyl Eosin, Eosin Bluish, Erythrosin Yellowish Blend, 4',5'-dibromofluorescein.

Among onium cationic photoinitiators, sulfonium compounds are preferred for thermal stability.

Another class of photoinitiators suitable for use in the present invention comprises photoactivatable organometallic complex salts such as those described in U.S. Pat. Nos. 5,059,701; 5,191,101; and 5,252,694. Such salts of organometallic cations have the general formula:

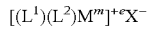

wherein $M^m$ represents a metal atom selected from elements of periodic groups IVB, VB, VIIB, and VIII, desirably Cr, Mo, W, Mn, Re, Fe, and Co;

$L^1$ represents none, one, or two ligands contributing π-electrons, wherein the ligands may be the same or different, and each ligand may be selected from the group consisting of substituted and unsubstituted alicyclic and cyclic unsaturated compounds and substituted and unsubstituted carbocyclic aromatic and heterocyclic aromatic compounds, each capable of contributing two to twelve π electrons to the valence shell of the metal atom M.

Desirably, $L^1$ is selected from the group consisting of substituted and unsubstituted η³-allyl, η5-cyclopentadienyl, η7-cycloheptatrienyl compounds, and η6-aromatic compounds selected from the group consisting of η 6-benzene and substituted η6-benzene compounds (for example, xylenes) and compounds having 2 to 4 fused rings, each capable of contributing 3 to 8 π electrons to the valence shell of $M^m$;

$L^2$ represents none or 1 to 3 ligands contributing an even number of .sigma.-electrons, wherein the ligands may be the same or different, and each ligand may be selected from the group consisting of carbon monoxide, nitrosonium, triphenyl phosphine, triphenyl stibine and derivatives of phosphorous, arsenic and antimony, with the proviso that the total electronic charge contributed to $M^m$ by $L^1$ and $L^2$ results in a net residual positive charge of e to the complex; e is an integer having a value of 1 or 2, the residual charge of the complex cation; and X is a halogen-containing complex anion, as described above.

Suitable commercially available cationic initiators include, but are not limited to, aromatic sulfonium complex salts FX-512™ (Minnesota Mining and Manufacturing Company, St. Paul, Minn.), CD-1012™ and CD-1010™ (Sartomer, Exton, Pa.); UVOX™ UVI-6976, an aromatic sulfonium complex salt (Dow Chemical, Midland, Mi.); and IRGACURE™ 261, a cationic organometallic complex salt (BASF Corporation, Florham Park, N.J.).

Where the cationic photoinitiator used for curing the adhesive composition is a metallocene salt catalyst, it optionally is accompanied by an accelerator such as an oxalate ester of a tertiary alcohol as described in U.S. Pat.

No. 5,436,063, although this is optional. Oxalate co-catalysts that may be used include those described in U.S. Pat. No. 5,252,694. The accelerator may comprise from about 0.01 to about 5 weight percent, desirably from about 0.1 to about 4 weight percent of the structural adhesive layer composition, based on the total weight of the resin (THFA copolymer, epoxy resin, polyether polyol and film-forming polymer) present in the composition.

The adhesive composition comprises one or more cationic photoinitiators in an amount, which varies depending on the light source and the degree of exposure. Desirably, the adhesive composition comprises one or more cationic photoinitiators in an amount of 0.1 to 5 parts by weight, based on 100 parts total weight of the adhesive composition. More desirably, the structural adhesive layer of the structural bonding tape of the present invention comprises one or more photoinitiators in an amount of from about 0.2 to about 3 parts by weight, based on 100 parts total weight of the adhesive composition.

The cured, partially cured or uncured adhesive composition may be coated on a substrate to form an adhesive article. For example, the substrate can be flexible or inflexible and can be formed from a polymeric material, glass or ceramic material, metal, or combination thereof such as E-coated metals. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose).

Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the crosslinked composition, crosslinked composition, or both. Such treatments include, for example, application of primer layers, surface modification layer (e.g., corona treatment or surface abrasion), or both.

In some embodiments the adhesive article comprises a nonwoven scrim embedded in the adhesive layer.

In some embodiments, the substrate is a release liner to form an adhesive article of the construction substrate/adhesive article layer/release liner. The adhesive article layer (comprising a foamed and non-foamed layer) may be cured, uncured or partially cured. Release liners typically have low affinity for the curable composition. Exemplary release liners can be prepared from paper (e.g., Kraft paper) or other types of polymeric material. Some release liners are coated with an outer layer of a release agent such as a silicone-containing material or a fluorocarbon-containing material.

The present disclosure further provides a method of bonding comprising the steps of providing a substrate (or workpiece) having a layer of the adhesive article on a surface thereof, exposing the adhesive article layer to actinic radiation (such as UV) to initiate curing, and affixing the first substrate to a second substrate (or workpiece), and optionally heating the bonded workpieces.

In one embodiment, a method of making a structural bonding adhesive article is provided. The method may be applied to either of both of the foamed and non-foamed layer(s). The method comprises: disposing a curable composition (of one or both layers) comprising a mixture of a first curable THFA copolymer and a second curable epoxy resin onto a release liner to provide an uncured adhesive; and irradiating the uncured adhesive using a first actinic light source to polymerize the first curable THFA copolymer without polymerizing the second curable epoxy resin thereby providing a partially cured adhesive layer(s), wherein the partially cured adhesive layer(s) is a pressure-sensitive adhesive that can be fully cured by irradiating the partially cured adhesive using a second actinic light source to polymerize the second curable resin.

In another embodiment, a method of bonding hardware to a substrate is provided, comprising: disposing the partially cured adhesive article on a bonding surface of either the hardware or the substrate, the partially cured adhesive article comprising a foamed and non-foamed layer(s) the reaction product of a curable composition of one or both layers irradiated by a first actinic light source, the curable composition comprised of: a) a free radical-polymerizable THFA composition; b) a cationically-polymerizable epoxy resin; c) a free radical photoinitiator sensitive to radiation from the first actinic light source; and d) a photoacid generator sensitive to radiation from a second actinic light source different from the first actinic light source; either before or after disposing the partially cured adhesive on the bonding surface, irradiating the partially cured adhesive article using the second actinic light source; placing the hardware so as to be bonded to the substrate by the partially cured adhesive article; and allowing the partially cured adhesive article, comprising a foamed layer and a non-foamed layer to fully cure.

In another embodiment, a curable composition for making a structural bonding adhesive article comprising at least one foamed layer and at least one non-foamed layer is provided, the curable composition of each layer comprising: a free radical-polymerizable THFA copolymer resin; a cationically-polymerizable epoxy resin; a free radical photoinitiator sensitive to radiation from the first actinic light source; and a photoacid generator insensitive to radiation from the first actinic light source but sensitive to radiation from a second actinic light source, wherein the free radical-polymerizable THFA resin and the cationically-polymerizable epoxy resin are capable of covalently bonding with each other when irradiated by the second actinic light source.

In an exemplary embodiment, the first actinic light source produces a spectral output with a peak intensity at a wavelength $\lambda_1$ of at least 380 nm, at least 383 nm, at least 386 nm, at least 390 nm, or at least 393 nm. In this embodiment, the peak intensity can be at a wavelength $\lambda_1$ of up to 420 nm, up to 419 nm, up to 418 nm, up to 417 nm, or up to 416 nm. The excitation dose used to activate the photoinitiator can be at least 200 mJ/cm$^2$, at least 250 mJ/cm$^2$, at least 300 mJ/cm$^2$, at least 350 mJ/cm$^2$, or at least 400 mJ/cm$^2$. The excitation dose can be up to 6400 mJ/cm$^2$, up to 5600 mJ/cm$^2$, 4800 mJ/cm$^2$, up to 4000 mJ/cm$^2$, or up to 3200 mJ/cm$^2$.

The partially cured adhesive resulting from the first step of irradiation is then irradiated using a second actinic light source to initiate a second curing reaction of the epoxy resin. The second actinic light source emits light over a distribution of wavelengths that is different from that of the first actinic light source. Here, the second actinic light source has a characteristic wavelength $\lambda_2$ different from the characteristic wavelength $\lambda_1$ of the first actinic light source 108. In preferred embodiments, the wavelength $\lambda_2$ is shorter than the wavelength $\lambda_1$.

The wavelength $\lambda_2$ depends in part on the characteristics of a second photoacid generator. The wavelength $\lambda_2$ at which the photoacid generator is triggered can be non-specific since it is used for the final curing step. In exemplary embodiments, the wavelength $\lambda_2$ can be at least 200 nm, at least 250 nm, at least 300 nm, at least 330 nm, or at least 356 nm. The wavelength $\lambda_2$ can be up to 380 nm, up to 377 nm, or up to 374 nm.

EXAMPLES

Examples

Materials

| Designation | Description |
| --- | --- |
| ARCOL LHT 240 | Polyether polyol obtained from Covestro LLC, Leverkusen Germany |
| ACCLAIM 2200 | Polyether polyol obtained from Covestro, LLC, Leverkusen Germany |
| EPON 1001F | epoxy resin comprised of diglycidyether of bisphenol A obtained from Momentive Specialty Chemicals, Inc., Columbus, OH |
| EPON 828 | epoxy resin comprised of diglycidyether of bisphenol A obtained from Momentive Specialty Chemicals, Inc., Columbus, OH |
| EPONEX 1510 | Epoxy resin comprised of diglycidyether of hydrogenated bisphenol A obtained from Momentive Specialty Chemicals, Inc., Columbus, OH |
| LEVAPREN 700HV | Ethylene-vinyl acetate copolymer obtained from Lanxess, Cologne Germany |
| PHENOXY PKHA | Phenoxy resin obtained from InChem, Charlotte NC |
| UVI6976 | Triaryl-sulfonium Hexafluoroantimonate, 50 wt % in propylene carbonate obtained from Aceto Corporation, Port Washington NY |
| GPTMS | 3-(Glycidoxypropyl) Trimethoxysilane obtained from United Chemical Technologies, Levittown PA |
| KANE ACE MX 267 | Core-shell rubber, 33 wt. % in bisphenol A epoxy resin, obtained from Kaneka, Tokyo Japan |
| MOWITAL B60HH | Poly(vinyl butyral) obtained from Kuraray, Tokyo Japan |
| CAB-O-SIL TS720 | Fumed silica obtained from Cabot, Boston MA |
| NYAD G | Wollastonite obtained from Imerys, Paris France |
| MISTRON VAPOR RE | Talc obtained from Imerys, Paris France |
| DUALITE E065-135 | Expanded polymer microspheres obtained from Chase Corporation, Westwood MA |
| EXPANCEL 031-DU-40 | Unexpanded polymer microspheres obtained from AkzoNobel, Amsterdam Netherlands |
| BA | Butyl acrylate obtained from BASF, Ludwigshafen Germany |
| R24332 | Fluoroaliphatic polymer obtained from 3M Company, St. Paul MN |
| GMA | Glycidyl methacrylate obtained from Dow Chemical, Midland MI |
| IRGACURE 651 | Benzyldimethyl ketal photoinitiator obtained from BASF SE, Ludwigshafen Germany |
| IRGACURE 819 | Bis(2,4,6-trimethylbenzoyl)-phenylphosphineoxide photoinitiator, obtained from BASF SE, Ludwigshafen Germany |
| IRGACURE TPO-L | 2,4,6-Trimethylbenxoylphenyl phosphinate obtained from BASF SE, Ludwigshafen Germany |
| IOTG | Isooctyl thioglycolate obtained from Evans Chemetics LP, Teaneck NJ |
| IBOA | Isobornyl acrylate (IBXA) obtained from San Esters, New York NY |
| THFA | Tetrahydrofurfuryl acrylate (V-150) obtained from San Esters, New York NY |
| NVP | N-Vinylpyrrolidone |
| HDDA | Hexanediol diacrylate obtained from Allnex USA Inc., Alpharetta GA |
| PETA | Pentaerytritol triacrylate, Sartomer Americas, Exton, PA |
| CRASTIN test pieces | 30% glass-reinforced PBT LW9030 BK851 obtained from DuPont, Wilmington DE |
| GRIVORY test pieces | 50% glass-reinforced PPA HTV-5H1 obtained from EMS, Sumter SC |
| JM 2L-5350 frit | Tempered glass test plaque with ceramic coating obtained from Cat-I Glass Manufacturing, South Elgin, IL |
| Ferro 24-80361 frit | Tempered glass test plaque with ceramic coating obtained from, Cat-I Glass Manufacturing, South Elgin, IL |
| Tempered glass | Clear tempered glass obtained from Industrial Glass Products, Los Angeles, CA |

The acrylic mixtures listed in TABLE 1 were prepared for use in compounding experiments. Acrylic mixtures M1 and M2 were prepared according METHOD A. This method is representative of that taught by Hamer (U.S. Pat. No. 5,804,610). Acrylic mixture M3 was prepared according to METHOD B.

TABLE 1

| | ACRYLIC MIXTURE (wt. %) | | |
|---|---|---|---|
| | M1 | M2 | M3 |
| BA | 50 | 49 | 50 |
| THFA | 50 | 49 | 50 |
| GMA | | 2 | |
| IRGACURE 651 | 0.2 | 0.2 | 0.04 |
| IOTG | 0.1 | 0.1 | |

Acrylic mixtures M1-M3 were used to prepare curable layers L1-L5 as listed in TABLE 2. Curable layers L1 and L2 were prepared according to METHOD C. Curable layers L3 and L4 were prepared according to METHOD D. Curable layer L5 was prepared according to METHOD E.

Test specimens were prepared for measurement of the tensile modulus (E'), stress at maximum load ($\sigma_{max\ load}$), and elongation by using METHOD F, using the total energy listed in TABLE 2 to initiate cure. Test specimens were prepared for parallel torque adhesion testing according to METHOD G using the total energy listed in TABLE 2 to initiate cure. The adhesive properties of curable layers L1-L5 were measured by the parallel torque test described in Method N.

TABLE 2

| FORMULATION (wt. %) | L1 | L2 | L3 | L4 | L5 |
|---|---|---|---|---|---|
| M1 | 33.3 | | | 32.4 | |
| M2 | | 33.3 | 32.4 | | |
| M3 | | | | | 48.0 |
| EPONEX 1510 | 19.1 | 19.1 | 18.6 | 18.6 | |
| EPON 828 | | | | | 25.4 |
| EPON 1001F | 19.1 | 19.1 | 18.6 | 18.6 | 13.0 |
| LEVAPREN 700HV | 9.0 | 9.0 | 8.8 | 8.8 | |
| PHENOXY PKHA | 9.0 | 9.0 | 8.8 | 8.8 | |
| ARCOL 240 LHT | 9.1 | 9.1 | 8.8 | 8.8 | |
| ACCLAIM 2200 | | | | | 9.6 |
| GPTMS | 0.9 | 0.9 | 0.9 | 0.9 | 1.0 |
| UVI 6976 | 0.5 | 0.5 | 0.5 | 0.5 | 2.9 |
| PETA | | | 2.4 | 2.4 | |
| HDDA | | | | | 0.12 |
| IRGACURE 819 | | | 0.02 | | 0.1 |
| IRGACURE TPO-L | | | | 0.02 | |
| ENERGY (J cm$^{-2}$) | 7.8 | 7.8 | 7.8 | 7.8 | 7.8 |
| CURE TIME (h) | 24 | 24 | 24 | 24 | 24 |
| TEMPERATURE (° C.) | RT | RT | RT | RT | RT |
| E' (MPa) | 25 | 40 | 29 | 50 | 33 |
| $\sigma_{max\ load}$ (MPa) | 4.3 | 6.1 | 7.8 | 10.3 | 9.5 |
| ELONGATION (%) | 86 | 98 | 163 | 155 | 63 |
| PARALLEL TORQUE (N m) | | | | | |
| SSL | 20 | 24 | 26 | 22 | 34 |
| Failure Mode | A | A | A | A | A |
| CRASTIN | 10 | 10 | 8 | 10 | 21 |
| Failure Mode | A | A | A | A | A |

A = Adhesive failure,
B = Break glass

Adhesive values shown in TABLE 2 showed a semi-structural adhesive torque resistance (>10 N-m) on the parallel torque test but did not demonstrate a cohesive failure mode.

The acrylic mixtures listed in TABLE 3 were prepared for use in compounding experiments. Acrylic mixtures M4-M7 were prepared according to METHOD B.

TABLE 3

| | ACRYLIC MIXTURE (wt. %) | | | |
|---|---|---|---|---|
| | M4 | M5 | M6 | M7 |
| 2EHA | 87.5 | 87.5 | 87.5 | 85 |
| AA | 12.5 | | | 15 |
| NVP | | 12.5 | | |
| IBOA | | | 12.5 | |
| IRGACURE 651 | 0.04 | 0.04 | 0.04 | 0.04 |

Acrylic mixtures M4-M7 were used to prepare curable layers L6-L12 and are listed in TABLE 4. Curable layers L6-L12 were prepared according to METHOD E.

Test specimens were prepared for measurement of the tensile modulus (E'), stress at maximum load ($\sigma_{max\ load}$), and elongation. Specimens of curable layers L6-L12 were prepared according to METHOD F, using the total energy listed in TABLE 4 to initiate cure.

Test specimens of curable layers L6-L12 were prepared according to METHOD I for testing the parallel torque adhesive properties as described in Method N.

TABLE 4

| FORMULATION (wt. %) | L6 | L7 | L8 | L9 | L10 | L11 | L12 |
|---|---|---|---|---|---|---|---|
| M4 | 99.5 | | | 95.7 | | | |
| M5 | | 99.5 | | | 95.7 | | |
| M6 | | | 99.5 | | | 95.7 | |
| M7 | | | | | | | 99.5 |
| DUALITE E065-135 | | | | 3.8 | 3.8 | 3.8 | |
| HDDA | 0.12 | 0.12 | 0.12 | 0.12 | 0.12 | 0.12 | 0.12 |
| IRGACURE 819 | 0.4 | 0.4 | 0.4 | 0.4 | 0.4 | 0.4 | 0.4 |
| ENERGY (J cm$^{-2}$) | 0 | 0 | 0 | 0 | 0 | 0 | 0 |
| TIME (h) | 24 | 24 | 24 | 24 | 24 | 24 | 24 |
| TEMPERATURE (° C.) | RT | RT | RT | RT | RT | RT | RT |
| E' (MPa) | 1.8 | 0.3 | 0.6 | 3.4 | 0.4 | 0.1 | |

TABLE 4-continued

| FORMULATION (wt. %) | L6 | L7 | L8 | L9 | L10 | L11 | L12 |
|---|---|---|---|---|---|---|---|
| $\sigma_{max\ load}$ (MPa) | 6.0 | 1.3 | 4.4 | 5.7 | 3.6 | 0.8 | |
| ELONGATION (%) | 1355 | 1241 | 2143 | 1135 | 1404 | 2858 | |
| PARALLEL TORQUE (Nm) | | | | | | | |
| SSL | — | — | — | — | — | — | — |
| Failure Mode | A | A | A | C | A | A | A |
| CRASTIN | — | — | — | — | — | — | — |
| Failure Mode | A | A | A | A | A | A | A |

A = Adhesive failure,
C = Cohesive failure,
— = no measurable deflection of the torque wrench Although L9 in TABLE 4 did demonstrate cohesive failure, it was not able to achieve a semi-structural bond (>10 N-m) strength.

Curable layer L13 in TABLE 5 was made using the procedure described in METHOD K, curable layers L14 and L17 were made according to the procedure described in METHOD E, and curable layers L15 and L16 were made according to the procedure described in METHOD O. Curable layers in TABLE 5 demonstrated a number of compositions that provided the right properties to make a frangible layer that allowed both semi-structural adhesion and a cohesive failure mode. The examples provided a means for creating controlled void space in the layer. In L13, the void space was provided by the addition of unexpanded microspheres (EXPANCEL 031-DU-40); in L14 and L17 the addition of pre-expanded microspheres (DUALITE E065-135) provided the void space; and in L15 and L16 the void space was provided by introducing nitrogen gas into the composition prior to coating by a frothing technique described in Method O.

Test specimens were prepared for measurement of the tensile modulus (E'), stress at maximum load ($\sigma_{max\ load}$), and elongation. Specimens of L13-L15 and L17 were prepared according to METHOD F, using the total energy listed in TABLE 5 to initiate cure. A test specimen of L16 was prepared using Method H, using the total energy listed in TABLE 5 to initiate cure. The densities of L13-L17 was measured by following the procedure described in Method M.

TABLE 5

| FORMULATION (wt. %) | L13 | L14 | L15 | L16 | L17 |
|---|---|---|---|---|---|
| M1 | 32.34 | | | | |
| M3 | | 47.7 | 47.00 | 47.00 | 45.7 |
| EPON 828 | | 24.33 | 24.91 | 24.91 | 24.2 |
| EPONEX 1510 | 18.56 | | | | |
| EPON 1001F | 18.56 | 12.39 | 12.69 | 12.69 | 12.3 |
| LEVAPREN 700HV | 8.78 | | | | |
| PHENOXY PKHA | 8.78 | | | | |
| ARCOL 240 LHT | 9.08 | | | | |
| ACCLAIM 2200 | | 9.18 | 9.4 | 9.4 | 9.1 |
| DUALITE E065-135 | | 2.3 | | | 4.7 |
| EXPANCEL 031-DU-40 | 1.0 | | | | |
| CAB-O-SIL TS720 | | | | .99 | |
| R24332 | | | .99 | .98 | |
| GPTMS | 0.9 | .92 | .99 | .98 | .90 |
| UVI 6976 | 2.99 | 2.75 | 2.70 | 2.68 | 2.7 |
| HDDA | | 0.22 | .15 | .15 | .11 |
| IRGACURE 819 | | 0.18 | .20 | .20 | .20 |
| ENERGY (J cm$^{-2}$) | 7.3 | 5.2 | 7.4 | 8.9 | 7.4 |
| TIME (h) | 24 | 24 | 24 | 24 | 24 |
| TEMPERATURE (° C.) | RT | RT | RT | RT | RT |
| E' (MPa) | 7.3 | 19.7 | 14.2 | 6.2 | 14 |

TABLE 5-continued

| FORMULATION (wt. %) | L13 | L14 | L15 | L16 | L17 |
|---|---|---|---|---|---|
| $\sigma_{max\ load}$ (MPa) | 2.8 | 3.9 | 3.3 | 2.5 | 3 |
| ELONGATION (%) | 105 | 51 | 57 | 63 | 43 |
| DENSITY (g/cc) | .83 | .79 | .68 | .59 | .79 |

Curable layer L19 in Table 6 was made according to Method C and curable layers L18, and L20 were made according to Method E. Test specimens of curable layers L18-L20 were prepared for measurement of the tensile modulus (E'), stress at maximum load ($\sigma_{max\ load}$), and elongation according to METHOD F, using the total energy listed in TABLE 6 to initiate cure.

TABLE 6

| FORMULATION (wt. %) | L18 | L19 | L20 |
|---|---|---|---|
| M2 | | 33.16 | |
| M3 | 47.87 | | 48.0 |
| EPON 828 | 25.37 | | 25.44 |
| EPONEX 1510 | | 19.04 | |
| EPON 1001F | 12.92 | 19.04 | 12.96 |
| LEVAPREN 700HV | | 9.01 | |
| PHENOXY PKHA | | 9.01 | |
| ARCOL 240 LHT | | 9.10 | |
| ACCLAIM 2200 | 9.57 | | 9.6 |
| GPTMS | .96 | .92 | 1.01 |
| UVI 6976 | 2.87 | .51 | 2.01 |
| HDDA | .23 | | .15 |
| IRGACURE 819 | .19 | | .20 |
| ENERGY (J cm$^{-2}$) | 5.2 | 5.2 | 5.2 |
| TIME (h) | 24 | 24 | 24 |
| TEMPERATURE (° C.) | RT | RT | RT |
| E' (MPa) | 23 | 56 | 26 |
| $\sigma_{max\ load}$ (MPa) | 11 | 7 | 11 |
| ELONGATION (%) | 68 | 76 | 71 |

Curable layers L21-L23 in TABLE 7 were made according to Method E. The amount of epoxy was varied to show the potential value in increasing the epoxy level in order to achieve improved adhesion. Test specimens were prepared for measurement of the tensile modulus (E'), stress at maximum load ($\sigma_{max\ load}$), and elongation. Specimens of curable layers L21-L23 were prepared according to METHOD F, using the total energy listed in TABLE 7 to initiate cure. The parallel torque adhesion of L21-L23 was measured by following the procedure described in Method N.

TABLE 7

| FORMULATION (wt. %) | L21 | L22 | L23 |
|---|---|---|---|
| M3 | 18.3 | 38.3 | 58.3 |
| EPON 828 | 41.61 | 30.90 | 20.30 |
| EPON 1001F | 21.20 | 15.74 | 10.34 |
| ACCLAIM 2200 | 15.70 | 11.66 | 7.66 |
| GPTMS | 1.0 | 1.0 | 1.0 |
| UVI 6976 | 2.0 | 2.0 | 2.0 |
| HDDA | .23 | .23 | .23 |
| IRGACURE 819 | .19 | .19 | .19 |
| ENERGY (J cm$^{-2}$) | 5.2 | 5.2 | 5.2 |
| TIME (h) | 24 | 24 | 24 |
| TEMPERATURE (° C.) | RT | RT | RT |
| E' (MPa) | 778 | 282 | 24.6 |
| $\sigma_{max\ load}$ (MPa) | 31.3 | 22.2 | 9.2 |
| ELONGATION (%) | 43 | 47 | 53 |
| PARALLEL TORQUE (N m) | | | |
| SSL | 35 | 32 | 19 |
| Failure Mode | A | A | A |

Multilayer construction COMPARATIVE EXAMPLES CE1-CE2 and EXAMPLES EX1-EX3 were prepared by laminating compositions described above into two-layer constructions according to METHOD M and shown in TABLE 8.

The adhesive properties of CE1-CE2 and EXAMPLES EX1-EX3 were measured by the parallel torque test. Test specimens of CE1-CE2 were prepared according to METHOD G using the total energy listed in TABLE 8 to initiate cure. Test specimens of EXAMPLES EX1-EX3 were prepared according to METHOD J using the total energy listed in TABLE 8 to initiate cure.

TABLE 8

EXAMPLES OF MULTILAYER CONSTRUCTIONS WITH TWO LAYERS

| LAYER | CE1 | CE2 | EX1 | EX2 | EX3 |
|---|---|---|---|---|---|
| LAYER A | L2 | L4 | L5 | L2 | L4 |
| caliper, mils (mm) | 20 (0.51) | 18 (0.46) | 22 (0.56) | 20 (508) | 18 (0.46) |
| LAYER B | L5 | L5 | L17 | L17 | L17 |
| caliper, mils (mm) | 22 (0.56) | 22 (0.56) | 47 (1.2) | 47 (1.2) | 47 (1.2) |
| TOTAL ENERGY (J cm$^{-2}$) | 7.8 | 7.8 | 7.4 | 7.4 | 7.4 |
| TIME (h) | 48 | 48 | 48 | 48 | 48 |
| TEMPERATURE (° C.) | RT | RT | RT | RT | RT |
| PARALLEL TORQUE (N m) | | | | | |
| SSL | 18 | 15 | 12 | 11 | 12 |
| Failure Mode | A | A | C | C | C |
| CRASTIN | 20 | 13 | 11 | 11 | 10 |
| Failure Mode | A | A | C | C | A |

A = Adhesive failure,
C = Cohesive failure

EXAMPLE EX1, EX2, and EX3 shown in TABLE 8 demonstrated a semi-structural bond strength and also the desirable cohesive failure mode. The addition of a frangible layer in a multilayer construction as represented in EXAMPLE EX1, EX2, and EX3 showed the benefit of the frangible layer in achieving cohesive failure while maintaining a semi-structural bond strength.

EXAMPLES EX4-EX7 of multilayer constructions are represented in TABLE 9 in which case all were hand laminated according to Method M. The individual layers were made by methods already described. The multilayer constructions were used to make test pieces according to Method G and tested for parallel torque adhesion using Method N. The adhesion values demonstrate a semi-structural bond and a largely cohesive failure mode.

TABLE 9

EXAMPLES OF MULTILAYER CONSTRUCTIONS WITH THREE LAYERS

| LAYER | EX4 | EX5 | EX6 | EX7 |
|---|---|---|---|---|
| LAYER A | L18 | L19 | L19 | L19 |
| caliper, mils (mm) | 5 (0.13) | 5 (0.13) | 5 (0.13) | 5 (0.13) |
| LAYER B | L13 | L15 | L16 | L13 |
| caliper, mils (mm) | 20 (0.51) | 40 (1.0) | 40 (1.0) | 20 (0.51) |
| LAYER A | L18 | L19 | L19 | L19 |
| caliper, mils (mm) | 5 (0.13) | 5 (0.13) | 5 (0.13) | 5 (0.13) |
| TOTAL ENERGY (J cm$^{-2}$) | 8.6 | 5.8 | 5.8 | 4.5 |
| TIME (h) | 24 | 24 | 24 | 24 |
| TEMPERATURE (° C.) | RT | RT | RT | RT |
| PARALLEL TORQUE (N m) | | | | |
| CRASTIN | 20.9 | 13.2 | 14.5 | 16.5 |
| Failure Mode | C | C | C | C |

A = Adhesive failure,
C = Cohesive failure,
I = Interlayer adhesive failure,
U = Uncured,
— = no measurable deflection of the torque wrench Methods Method A. (Acrylic Mixtures M1-M2)

Acrylic mixtures M1 and M2 were each prepared by the method of Hamer (U.S. Pat. No. 5,804,610). Solutions were prepared by combining the acrylic monomers, radical photoinitiator (IRGACURE 651) and chain-transfer agent (IOTG), in the amounts shown in TABLE 1, in an amber glass jar and were stirred until a homogenous mixture was obtained. The mixture was divided into 25 gram aliquots within heat sealed compartments of "Tortoise" film, immersed in a 16° C. water bath, and polymerized using UV light (UVA=4.7 mW cm$^{-2}$, 8 minutes per side).

Method B. (Acrylic Mixtures M3-M7)

Acrylic mixtures were each prepared by charging a glass jar with the appropriate acrylic monomers and IRGACURE 651 in the amounts shown in TABLE 1 and TABLE 3, and stirring until the photoinitiator had dissolved and a homogeneous mixture was obtained. Each mixture was degassed by introducing nitrogen gas into it through a tube inserted through an opening in the jar's cap and bubbling vigorously for at least 5 minutes. While stirring, each mixture was exposed to UV-A light until the mixture achieved a viscosity deemed suitable for coating. Following UV exposure, air was introduced into the jar. The light source was an array of LEDs having a peak emission wavelength of 365 nm Method C. (Hot Melt Extrusion Procedure)

Curable layers L1, L2 and L24 were prepared using an APV MP2030 30 mm diameter co-rotating twin-screw extruder. The solid resins were fed via gravimetric feeders into the feed throat and melted/mixed at approximately 150° C. Then the acrylic mixture was pumped onto this material and mixed again at approximately 150° C. The remainder of the extruder was controlled to approximately 80° C. to reduce the melt temperature. Subsequently, the liquid resins and additives were added onto this blend and mixed again. Finally, the melt was exposed to a vacuum to remove any entrapped gases. The extrudate was pumped through a 6" (15 cm) slot-die at 80° C. and cast onto release liner. Care was taken to minimize ambient light exposure of the finished rolls of adhesive.

Method D. (Hot Melt Extrusion with UV Initiated Inline B-Staging)

Curable layers L3 and L4 were prepared using an APV MP2030 30 mm diameter co-rotating twin-screw extruder. The solid resins were fed via gravimetric feeders into the feed throat and melted/mixed at approximately 150° C. Then the acrylic mixture was pumped onto this material and mixed again at approximately 150° C. The remainder of the extruder was controlled to approximately 80° C. to reduce the melt temperature. Subsequently, the liquid resins and additives were added onto this blend and mixed again. Finally, the melt was exposed to a vacuum to remove any entrapped gases. The extrudate was pumped through a 6" (15 cm) slot-die at 80° C. and cast onto release liner. The cast film was exposed to 1.4 J cm$^{-2}$ of UVA2 energy on the open surface of the composition in a nitrogen-inerted environment using an array of LEDs having a peak emission wavelength of 405 nm. The total UVA2 energy was determined using a POWER PUCK II radiometer (EIT, Inc., Sterling, Va.). Care was taken to minimize ambient light exposure of the finished rolls of adhesive.

Method E

Curable layers L5-L12, L14-L18, L20-L23 and L25-27 were prepared by charging a glass jar with EPON 828 and EPON 1001F in the amounts shown in TABLE 2, TABLES 4-7, and TABLE 10 and heating the slurry in an oven heated to 135° C. until a homogenous mixture was obtained. ACCLAIM 2200 was added with stirring and the mixture was allowed to cool to ambient temperature. Acrylic mixture M3 or acrylic monomers, GPTMS, UVI 6976, IRGACURE 819, and additives were added in the amounts shown in TABLE 2, TABLE 4-7 and TABLE 10.

Curable layers L6-L12 were each prepared by charging a glass jar with the appropriate acrylic mixture, HDDA, and IRGACURE 819 in the amounts shown in TABLE 4.

Curable layers L5-L12, L14-L18, L20-L23 and L25-L27 after being compounded were protected from light and were placed on a jar-roller overnight.

Curable layers L5-L12, L14-L18, and L20-L23 and L25-L27 were then coated between silicone release-coated PET liner using a two-roll coater having a gap setting of 0.005-0.040 inches (127-1016 micrometers) greater than the combined thickness of the two liners, and exposed to UVA energy using a plurality of fluorescent bulbs having a peak emission wavelength of 420 nm. The total UVA2 energy was determined using a POWER PUCK II radiometer equipped with low power sensing head (EIT, Inc., Sterling, Va.). at a web speed of 12-15 feet per minute (3.7-4.6 meters per minute). The radiometer web speed and energy were then used to calculate the total exposure energy at the web speed used during curing of the acrylic composition.

Method F (Sample Curing Procedure Applying Irradiation to One Face of the Adhesive)

A 180 mm×140 mm portion of each composition, between release liners, was obtained. The first liner was removed and the composition was exposed to UV-A radiation using an array of LEDs having a peak emission wavelength of 365 nm (CLEARSTONE TECHNOLOGIES, Hopkins, Minn.). The liner was repositioned over the sample after the UV exposure was complete. The total UV-A energy was determined using a POWER PUCK II radiometer (EIT, Inc., Sterling, Va.) and is listed in TABLE 2, and TABLES 4-10 in addition to the cure time and cure temperature. Dog-bone specimens were die-cut from the cured material in the cross-machine direction and were loaded to failure using an INSTRON Tensile Tester Model 5565 or Model 5965 (INSTRON CORP., Canton, Mass.). Specimens were tested at 20 inches (51 cm) per minute. The tensile modulus (E') was calculated from the slope of the stress-strain curve and the stress at maximum load ($\sigma_{max\ load}$) and elongation at break were recorded.

Method G (Test Piece Bond Making Procedure Using Irradiation on One Face of the Adhesive)

Test pieces, made of sintered stainless steel (SSL), CRASTIN, or GRIVORY measuring 22 mm×28 mm×4 mm, and tempered glass plaques, measuring 127 mm×50 mm×4 mm were wiped with isopropyl alcohol and were allowed to air-dry. Test specimens, measuring 22 mm×28 mm×4 mm and between release liners, were die-cut from each composition. The first liner was removed and the test specimen was applied to the SSL, CRASTIN, or GRIVORY test pieces using hand-pressure. The second liner was removed and the assembly was exposed to UV-A radiation using an array of LEDs having a peak emission wavelength of 365 nm (CLEARSTONE TECHNOLOGIES, Hopkins, Minn.). The assembly was applied to the glass substrate and was pressurized to 20-60 psi (150-470 N) for 6 seconds using a pneumatic ram with a plate measuring 22 mm×28 mm. The total UV-A energy was determined using a POWER PUCK II radiometer (EIT, Inc., Sterling, Va.) and is listed in TABLE 2, TABLES 4-9 in addition to the cure time and cure temperature. Cured specimens were tested to failure by clamping the glass plaque in a horizontal orientation and steadily twisting the SSL, CRASTIN, or GRIVORY test piece using a digital torque wrench (CRAFTSMAN). The maximum deflection and failure mode were recorded.

Method H (Sample Curing Procedure Applying Irradiation to Each Face of the Adhesive)

A 180 mm×140 mm portion of each composition, between release liners, was obtained. The first liner was removed and the composition was exposed to UV-A radiation using an array of LEDs having a peak emission wavelength of 365 nm (CLEARSTONE TECHNOLOGIES, Hopkins, Minn.). After this first exposure, the first liner was repositioned over the specimen, the specimen was flipped over, and the second liner was removed. The sample was exposed a second time to UV-A radiation using an array of LEDs having a peak emission wavelength of 365 nm. The total UV-A energy was determined using a POWER PUCK II radiometer (EIT, Inc., Sterling, Va.) and is listed in TABLE 2, and TABLES 4-9 in addition to the cure time and cure temperature. Dog-bone specimens were die-cut from the cured material in the cross-machine direction and were loaded to failure using an INSTRON Tensile Tester Model 5565 (INSTRON CORP., Canton, Mass.). Specimens were tested at 20 inches (51 cm) per minute. The tensile modulus (E') was calculated from the slope of the stress-strain curve and the stress at maximum load ($\sigma_{max\ load}$) and elongation at break were recorded.

Method I (Test Piece Bond Making Procedure for Non-Reactive Samples (PSA))

Test pieces, made of sintered stainless steel (SSL) or CRASTIN, measuring 22 mm×28 mm×4 mm, and tempered glass plaques, measuring 127 mm×50 mm×4 mm were wiped with isopropyl alcohol and were allowed to air-dry. Test specimens, measuring 22 mm×28 mm×4 mm and between release liners, were die-cut from each composition. The first liner was removed and the test specimen was applied to the SSL or CRASTIN test pieces using hand-pressure. The second liner was removed and the assembly was applied to the glass substrate and was pressurized to 20-60 psi (150-470 N) for 6 seconds using a pneumatic ram with a plate measuring 22 mm×28 mm. The dwell time and cure temperature are listed in TABLE 4. Specimens were tested to failure by clamping the glass plaque in a horizontal orientation and steadily twisting the SSL or CRASTIN test piece using a digital torque wrench (CRAFTSMAN). The maximum deflection and failure mode were recorded.

Method J (Test Piece Bond Making Procedure Applying Irradiation to Each Face of the Adhesive)

Test pieces, made of sintered stainless steel (SSL) or CRASTIN, measuring 22 mm×28 mm×4 mm, and tempered glass plaques, measuring 127 mm×50 mm×4 mm were wiped with isopropyl alcohol and were allowed to air-dry. Test specimens, measuring 22 mm×28 mm×4 mm and between release liners, were die-cut from each composition. The first liner was removed and the composition was exposed to UV-A radiation, on the face to be placed into contact with the SSL or CRASTIN test piece, using an array of LEDs having a peak emission wavelength of 365 nm (CLEARSTONE TECHNOLOGIES, Hopkins, Minn.). The exposed test specimen was applied to the SSL or CRASTIN test pieces using hand-pressure. The second liner was removed and the assembly was exposed a second time to UV-A radiation using an array of LEDs having a peak emission wavelength of 365 nm. The assembly was applied to the glass substrate and was pressurized 20-60 psi (150-470 N) for 6 seconds using a pneumatic ram with a plate measuring 22 mm×28 mm. The total UV-A energy was determined using a POWER PUCK II radiometer (EIT, Inc., Sterling, Va.) and is listed in TABLE 4, and TABLE 5 in addition to the cure time and cure temperature.

Method K (Hot Melt Extrusion Procedure)

Curable layer 13 was prepared using an APV MP2030 twin-screw extruder, located in St. Paul, Minn. Solid resins, the acrylic mixture, liquid resins, EXPANCEL 031-DU-40, and additives were added to the extruder. The extrudate was pumped through a slot-die at 93° C. and cast onto release liner.

Method L (Multilayer Hand Laminating Procedure)

A 180 mm×140 mm portion of each LAYER A and LAYER B composition, between release-coated liners, was obtained. The first liner was removed from each portion, and each LAYER A and LAYER B composition were laminated together to give a multilayer adhesive article having construction LAYER A-LAYER B, as indicated in TABLE 8 and TABLE 9, by applying hand pressure via use of a plastic spreader. Care was taken to minimize bubbles and voids and align layers parallel to the machine direction. To obtain a multilayer article having construction LAYER A-LAYER B-LAYER A, a 180 mm×140 mm portion of a second LAYER A composition was obtained and its first liner was removed. The remaining liner from the LAYER B portion of the laminate was removed and the second LAYER A composition was then laminated to the LAYER B portion of the laminate, as indicated in TABLE 9, by applying hand pressure via use of a plastic spreader. Again, care was taken to minimize bubbles and voids and align layers parallel to the machine direction. (It will be noted that in some other constructions, a "LAYER C" could be used in place of the second LAYER A, to give a multilayer adhesive article having construction LAYER A-LAYER B-LAYER C, where LAYER C could be a curable adhesive layer having a composition different from LAYER A and LAYER B.)

Method M (Density Measurement Procedure)

Using a 20 mm×30 mm steel rule die rectangles were cut out of the adhesive film that was contained between two PET silicone release coated liners. Samples were measured for caliper thickness and weighed. The two liners were caliper was also measured and they were weighed so that the adhesive film thickness and weight could be calculated. From these measurements densities were calculated.

Method N (Parallel Torque Test Procedure)

Test pieces made according to Method G, I or J were tested after test pieces were fully cured. The specimens were tested to failure by clamping the glass plaque in a horizontal orientation and steadily twisting the SSL, CRASTIN, or GRIVORY test piece using a digital torque wrench (CRAFTSMAN) in a plane horizontal to the test piece. The maximum deflection is recorded by the torque wrench. Failure modes are assessed in the following way: If adhesive is located on both adherends the failure is considered cohesive failure. If there is no adhesive on one substrate the failure mode is considered adhesive failure. At times there are mixed failure modes on a test piece in which case a percentage of surface for each failure modes is so designated; e.g. 30% cohesive/70% adhesive.

Method O (Frothing Process Description)

Curable layers 15 and 16 were transferred to a frother as described for examples in U.S. Pat. No. 4,415,615; incorporated herein by reference. While feeding nitrogen gas into the frother, the frothed adhesive can be delivered to the nip of a roll coater between a pair of transparent, (e.g. biaxially-oriented polyethylene terephthalate) films. A silicone or fluorochemical surfactant is included in the frothed syrup. Various surfactants are known including copolymer surfactants described in U.S. Pat. No. 6,852,781. The frothed adhesive was then coated as described in METHOD E.

The compositions L25, L26 and L27 of TABLE 10 were used to make multi-layer EX 9 and Ex 10 using Method E. EX 8, a single layer composition, was made using Method C. Test specimens were prepared for long term humidity aging with resistance according to Method S. A successful test result is for the bond to remain intact with no relative movement between the two substrates that are held by the adhesive for 1000 hours. After completion of 1000 hours in heat and humidity with resistance the test assembly is tested for bond strength using Method G. The results are shown in Tables 12.

Method S (Long Term Humidity Resistance with Load)

Test assemblies were prepared per Method G using CRASTIN and GRIVORY test pieces and 3 different glass substrates, but not destructively tested. The glass substrates were 1.) tempered glass 2.) tempered glass with a Johnson Matthey ceramic frit coating; JM 2L-5350 and 3.) tempered glass with a Ferro ceramic frit coating; 24-80361. The test pieces are designed so that a weight can be attached putting the bond in a cleavage stress and then the assembly with weight attached can be tested at various environmental conditions. The assembly was put in an environmental chamber controlled to 65° C. and 80% RH and loaded in a cleavage mode with 1 kg.

TABLE 10

| FORMULATION (wt %) | L24 | L25 | L26 | 271 |
|---|---|---|---|---|
| M2 | 31.6 | | | |
| M3 | | 37.82 | 46.50 | |
| BUTYL ACRYLATE | | | | 22.11 |
| THF ACRYLATE | | | | 22.11 |
| EPONEX 1510 | 19.1 | | | |
| EPON 828 | | 30.63 | 24.65 | 23.58 |
| EPON 1001F | 19.1 | 15.32 | 12.32 | 11.79 |
| LEVAPREN 700HV | 9.6 | | | |
| PHENOXY PKHA | 9.6 | | | |

TABLE 10-continued

| FORMULATION (wt %) | L24 | L25 | L26 | 271 |
|---|---|---|---|---|
| MOWITAL B60HH | | | | 4.76 |
| ARCOL 240 LHT | 9.6 | | | |
| ACCLAIM 2200 | | 11.85 | 9.53 | 8.85 |
| Dualite E065-135 | | | 2.50 | 2.38 |
| GPTMS | 0.9 | 1.0 | 1.0 | .95 |
| UVI 6976 | 0.5 | 3.0 | 3.0 | 2.86 |
| HDDA | | 0.20 | 0.25 | .24 |
| IRGACURE 819 | | 0.16 | 0.20 | .38 |
| ENERGY (J cm$^{-2}$) | NA | 3.4 | 3.4 | 3.4 |
| CURE TIME (h) | 24 | 24 | 24 | 24 |
| TEMPERATURE (° C.) | RT | RT | RT | RT |

TABLE 11

EXAMPLES FOR LONG TERM HUMIDTY AGING WITH RESISTANCE TESTING

| LAYER | CEX 9 | EX 10 | EX11 |
|---|---|---|---|
| LAYER A | | L25 | L25 |
| caliper, mils (mm) | | 5 (0.13) | 5 (0.13) |
| LAYER B | L24 | L26 | L27 |
| caliper, mils (mm) | 20 (0.51) | 20 (0.51) | 20 (0.51) |
| LAYER A | | L25 | L25 |
| caliper, mils (mm) | | 5 (0.13) | 5 (0.13) |
| TOTAL ENERGY (J cm$^{-2}$) | 11.5 | 7.2 | 7.2 |
| TIME (h) | 24 | 24 | 24 |
| TEMPERATURE (° C.) | RT | RT | RT |

TABLE 12

LONG TERM HUMIDITY AGING WITH RESISTANCE TEST RESULTS

| EXAMPLE | TEST PIECE | GLASS | % GOING 1000 HOURS | PARALLEL TORQUE (N-m) | FAILURE MODE |
|---|---|---|---|---|---|
| CEX8 | CRASTIN | LAMINATED | 25 | 14.4 | ADHESIVE |
| CEX8 | CRASTIN | FRIT 24-80361 | 50 | 15.5 | ADHESIVE |
| EX9 | CRASTIN | LAMINATED | 100 | 16.1 | COHESIVE |
| EX9 | CRASTIN | FRIT 24-80361 | 100 | 20.3 | COHESIVE |
| EX9 | CRASTIN | FRIT 2L-5350 | 100 | 17.9 | COHESIVE |
| EX10 | GRIVORY | LAMINATED | 100 | 19.9 | COHESIVE |
| EX10 | GRIVORY | FRIT 24-80361 | 100 | 20.3 | COHESIVE |
| EX10 | GRIVORY | FRIT 2L-5350 | 100 | 21.8 | COHESIVE |

The data shows the benefit of a multilayer construction in meeting the Long Term Humidity Resistance with Load test requirements and demonstrating the desirable cohesive failure mode.

What is claimed is:

1. A multilayer article comprising:
   1) a first curable adhesive layer comprising:
      a. 15 to 65 parts of a tetrahydrofurfuryl (meth)acrylate copolymer;
      b. 25 to 50 parts of an epoxy resin component;
      c. 5-15 parts of a liquid polyether polyol;
      e. 0.01-5 parts cationic photoinitiator, relative to 100 parts a to c;
      and
   2) a second curable foam layer comprising:
      a. 15 to 50 parts of a tetrahydrofurfuryl (meth)acrylate copolymer;
      b. 25 to 50 parts of an epoxy resin component;
      c. 5-15 parts of a liquid polyether polyol;
      e. 0.01-5 parts cationic photoinitiator, relative to 100 parts a to c.

2. The multilayer article of claim 1, wherein the first curable adhesive layer further comprises up to 25 parts of a hydroxy-functional film-forming polymer, wherein the hydroxy-functional film-forming polymer is selected from phenoxy resins, ethylene-vinyl acetate (EVA) copolymers, polycaprolactone polyols, polyester polyols, and polyvinyl acetal resins, and wherein the second curable foam layer further comprises up to 25 parts of a hydroxy-functional film-forming polymer, wherein the hydroxy-functional film-forming polymer is selected from phenoxy resins, ethylene-vinyl acetate (EVA) copolymers, polycaprolactone polyols, polyester polyols, and polyvinyl acetal resins.

3. The multilayer article of claim 2, wherein the hydroxy-functional film-forming polymer of the second curable foam layer is selected from phenoxy resins, ethylene-vinyl acetate (EVA) copolymers, polycaprolactone polyols, polyester polyols, and polyvinyl acetal resins that are solid at 25° C.

4. The multilayer article of claim 2, wherein the hydroxyl-functional film-forming polymer of the second curable foam layer has a hydroxyl number of at least 0.01.

5. The multilayer article of claim 1 wherein the tetrahydrofurfuryl (meth)acrylate copolymer of the first adhesive layer comprises:
   a) 40-60 wt. % of tetrahydrofurfuryl (meth)acrylate monomer;
   b) 40-60 wt. % of $C_1$-$C_8$ alkyl (meth)acrylate ester monomer; and
   c) 0 to 10 wt. % of a multifunctional (meth)acrylate, relative to 100 parts of a and b.

6. The multilayer article of claim 1, wherein the weight ratio of the epoxy resin component to the tetrahydrofurfuryl (meth)acrylate copolymer in the first curable adhesive layer is from 1:2 to 5:1 and the weight ratio of the epoxy resin component to the tetrahydrofurfuryl (meth)acrylate copolymer in the second curable foam layer is from 1:2 to 5:1.

7. The multilayer article of claim 1, wherein the epoxy resin component of the first curable adhesive layer comprises cationically reactive (meth)acrylate ester functional monomer in amounts of 0.1 to 5 wt. % and wherein the epoxy resin component of the second curable foam layer comprises cationically reactive (meth)acrylate ester functional monomer in amounts of 0.1 to 5 wt. %.

8. The multilayer article of claim 1, wherein the cationic photoinitiator in the first curable adhesive layer and in the second curable foam layer is a sulfonium or iodonium salt.

9. The multilayer article of claim 1, wherein the epoxy resin component of the first curable adhesive layer comprises two or more epoxy resins, wherein at least one epoxy resin has an epoxy equivalent weight of from about 150 to about 250, and at least one epoxy resin has an epoxy equivalent weight of from about 500 to about 600.

10. The multilayer article of claim 1, wherein the tetrahydrofurfuryl (meth)acrylate copolymer of the first curable adhesive layer and the second curable foam layer has no acid functional monomer units.

11. The multilayer article of claim 1, wherein the molar average carbon number of a $C_1$-$C_8$ alkyl (meth)acrylate ester of the tetrahydrofurfuryl (meth)acrylate copolymer of the first curable adhesive layer and the second curable foam layer is 3-6.

12. The multilayer article of claim 1, wherein the tetrahydrofurfuryl (meth)acrylate copolymer of the first curable adhesive layer and the second curable foam layer is a tetrahydrofurfuryl/butyl acrylate copolymer.

13. The multilayer article of claim 1, wherein at least one of the first curable adhesive layer and the second curable foam layer comprises:
  a. 25 to 50 parts of a tetrahydrofurfuryl (meth)acrylate copolymer;
  b. 35 to 45 parts of an epoxy resin component;
  c. 5-15 parts of a polyether polyol;
  d. 0 to 25 parts of a hydroxy-functional film-forming polymer;
    wherein the sum of a) to d) is 100 parts by weight; and
  e. 0.1 to 5 parts of a cationic photoinitiator, relative to 100 parts of a) to d).

14. The multilayer article of claim 1, wherein the foam layer comprises expandable polymeric microspheres.

15. The multilayer article of claim 1, wherein the foam layer comprises pre-expanded polymeric microspheres.

16. A multilayer adhesive article comprising:
1) a first layer of a first composition comprising a reaction product of:
  a. 15 to 50 parts of a tetrahydrofurfuryl (meth)acrylate copolymer;
  b. 25 to 50 parts of an epoxy component;
  c. 5-15 parts of a liquid polyether polyol; and
  e) the residue of a cationic photoiniator
    wherein the sum of a) to c is 100 parts by weight; and
2) a second layer of a second curable composition comprising a reaction product of:
  a. 15 to 50 parts of a tetrahydrofurfuryl (meth)acrylate copolymer;
  b. 25 to 50 parts of an epoxy component;
  c. 5-15 parts of a liquid polyether polyol;
  e) a void initiating component; and
  f) the residue of a cationic photoiniator;
    wherein the sum of a) to c is 100 parts by weight.

17. The multilayer article of claim 16 wherein the second layer has a density of 0.4 to 0.85 g/cm$^3$.

18. The multilayer article of claim 16 wherein the second layer has a tensile strength of 350-800 psi (2.4-5.5 MPa).

19. The multilayer article of claim 16 wherein the first layer has a tensile strength of 1500 to 4800 psi (10.4-33.1 MPa).

20. A method of bonding comprising the steps of providing a first substrate having the multilayer article of claim 1 affixed a surface thereof, exposing the multilayer article to actinic radiation to initiate curing, affixing the first substrate to a second substrate, and optionally heating the bonded substrates.

* * * * *